(12) United States Patent
Rubbo

(10) Patent No.: US 8,968,041 B2
(45) Date of Patent: Mar. 3, 2015

(54) DEVICE FOR CAPTURING, TRANSMITTING, AND DISPLAYING INDIVIDUAL ROWER DATA

(71) Applicant: Angelo Rubbo, Pelham Manor, NY (US)

(72) Inventor: Angelo Rubbo, Pelham Manor, NY (US)

(*) Notice: Subject to any disclaimer, the term of this patent is extended or adjusted under 35 U.S.C. 154(b) by 51 days.

(21) Appl. No.: 13/655,062

(22) Filed: Oct. 18, 2012

(65) Prior Publication Data

US 2013/0095711 A1 Apr. 18, 2013

Related U.S. Application Data

(60) Provisional application No. 61/538,482, filed on Oct. 18, 2011.

(51) Int. Cl.

| | | |
|---|---|---|
| *B60L 1/14* | (2006.01) | |
| *B63H 16/00* | (2006.01) | |
| *B63H 16/04* | (2006.01) | |
| *B63H 16/02* | (2006.01) | |
| *G01D 21/02* | (2006.01) | |
| *B63J 99/00* | (2009.01) | |

(52) U.S. Cl.
CPC ............... *B63H 16/04* (2013.01); *B63H 16/02* (2013.01); *G01D 21/02* (2013.01); *B63J 2099/006* (2013.01)
USPC .................................................. 440/2; 440/21

(58) Field of Classification Search
CPC ............... A63B 69/06; A63B 2225/50; A63B 22/0076; A63B 24/00; A63B 2220/17; A63B 21/0052; B63H 16/04; B63H 16/02; G01D 21/02; B63J 2099/006
USPC .......................... 440/2, 21; 482/8, 72; 434/247
See application file for complete search history.

(56) References Cited

U.S. PATENT DOCUMENTS

| | | | |
|---|---|---|---|
| 7,207,853 B2 * | 4/2007 | Spencert et al. ................. | 440/21 |
| 2005/0085348 A1 * | 4/2005 | Kiefer et al. .................... | 482/72 |
| 2006/0035753 A1 * | 2/2006 | Baker .............................. | 482/51 |
| 2006/0116037 A1 * | 6/2006 | Squires .......................... | 440/113 |

OTHER PUBLICATIONS

Gwelleh Rachelle Hsu, "smartSHELL: Measuring and Motivating Human Performance in an Outdoor Rowing Environment," Thesis (M.S.) MIT 1998; http://hdl.handle.net/1721.1/62120.*

* cited by examiner

*Primary Examiner* — Lars A Olson
*Assistant Examiner* — Anthony Wiest
(74) *Attorney, Agent, or Firm* — Power Del Valle LLP

(57) ABSTRACT

A device that captures and processes individual rower data and transmits the data to a display for use by the coxswain or the coach to enable the provision of immediate feedback to one or more rowers in order to improve the overall performance of the boat.

7 Claims, 6 Drawing Sheets

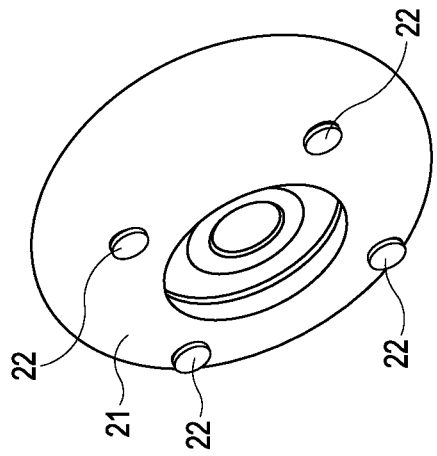
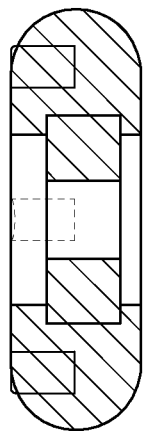
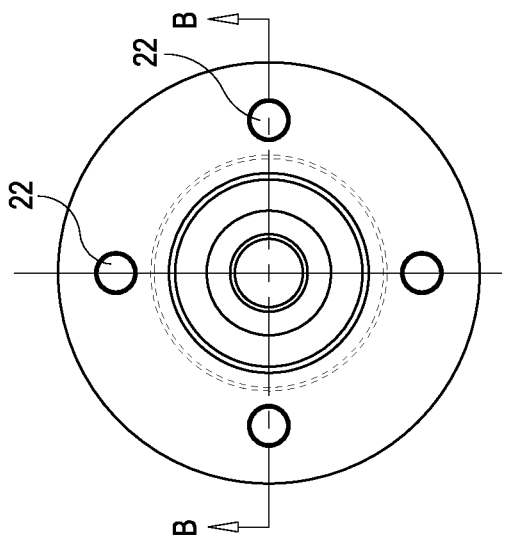
FIG. 2C
FIG. 2B
FIG. 2A

DEVICE FOR CAPTURING, TRANSMITTING, AND DISPLAYING INDIVIDUAL ROWER DATA

The present invention is directed to a device that captures and processes individual rower data and transmits the data to a display for use by the coxswain or the coach to enable the provision of immediate feedback to one or more rowers in order to improve the overall performance of the boat.

BACKGROUND OF THE INVENTION

Rowing is a specialized sport that generally is not introduced to an athlete until high school or college. While rowing, the athlete sits in the boat facing backwards (towards the stern), and uses the oars which are held in place by the oarlocks to propel the boat forward (towards the bow). The rower places the blade in the water, ties his or her feet into shoes or footstretchers, then applies pressure to the oar by simultaneously pushing the moveable seat toward the bow of the boat by extending the legs (this movement is called the drive). The rower then removes the oar from the water and compresses the legs which moves the seat towards the stern of the boat (this movement is called the recovery), allowing the boat to glide through the water. In a multi-person boat, these motions must be executed in precise synchrony with all other rowers in the boat.

The novice rower must learn these and other new motions as well as the physics behind the application of power. He or she must understand the techniques needed to increase the speed of the boat on the drive and to allow the boat to "run out" or glide a longer distance (called the run/recovery) between each application of power, i.e., the next stroke.

Most novice rowers are introduced to the sport by rowing an eight person shell, which is a boat having eight rowers and a coxswain. The coxswain acts as an in-boat coach, strategist, and driver. The coxswain sits in the stern of the boat and can only see the "stroke of the boat" (the person sitting in the front who sets the pace and cadence for all the rowers in the boat). Each rower sits in a line behind the stroke seat. The boat is approximately two feet wide and 55 feet long. The coxswain can see what the stroke is doing and can see the oars of the other rowers, but has no other data on how those other seven rowers are performing. An experienced coxswain "feels" what the boat is doing but cannot assess how any of the other seven rowers are impacting the progress of the boat.

Rowers improve by practicing drills which are overseen by the coxswain in the stern of the boat and/or by the coach who is moving alongside the rowers in a launch. Since the sides of the boat (the gunnels) are four to six inches above the seat platform, the coach cannot see what each individual rower is doing or whether each rower is synchronized with stroke.

There are on board devices currently on the market to aid in coaching rowers. Some of these devices measure rowers' stroke cadence as a whole. Other devices such as accelerometers and global positioning service (GPS) devices are used which provide boat movement data only. Many of these devices are heavy, making them less than desirable in a sport where lightness translates to speed. Moreover, some include sensors that are attached through wires to riggers or foot stretchers can impede free movement of the rowers. There are no devices that measure or show data relating to the performance of an individual rower or comparing the individual rower to the other rowers within the same boat.

SUMMARY OF THE INVENTION

The present invention relates to a series of devices, which can be either mechanical or electronic, that are installed at each rower's position and captures data specific to each rower's performance. This data can be transmitted to a "hub" that acts as the master controller of each installed device. The "hub" queries each device, obtains the data, organizes the data, and sends the data out either wirelessly to the coach or coxswain or through an in-boat wire to the coxswain. A personal computing device obtains and processes the data and presents the data to at least one screen for view by the athlete, coach, or coxswain. This provides for a simple, easily installed system that has minimal or no hard wiring and which provides accurate individualized rower data that can be used to provide immediate individualized feedback or for later analysis. There is no prior art device that can provide this specialized individualized rower data for each rower as well as compare each rower's movement to the stroke of the boat.

Specific data that can be collected with this system from each rower includes: slide length of each stroke on both the drive and recovery; speed of the slide on the drive and recovery; the deceleration of the slide of each rower and the impact each rower's deceleration has on the boat performance (known as boat check); stroke rate, i.e., the number of strokes the rower takes in one minute; and ratio of drive to recovery of each full stroke for each rower. Additional data such as workout lengths, running workout clock, number of strokes taken and other various data can also be collected. Accelerometers will also provide specific data as to the overall boat performance in identifying overall boat speed, distance, and acceleration and deceleration of the boat.

This data will be captured, calculated, and provided to the coxswain and coach for almost real time display for interpretation and feedback on technique and body positioning to each individual rower. The data can also be captured to a file and made available for future download and analysis by the rower, coxswain or coach. Further, the data may be uploaded and downloaded for comparative analysis over time.

This mechanism was intended to reduce the learning curve of novice athletes introduced to the sport of rowing and allow the progression to occur expeditiously, much quicker than traditionally trained rowers. This device will also be applicable in the more competitive elite rower environment. Since the device for capturing individual athlete/rower data is not cumbersome in any way, it can be installed in multiple boats owned by an individual, club or team.

Additional tools can be incorporated into a personal computing device to produce a series of sounds which the rowers can follow to emulate good ratio of drive versus recovery movement. This component of the software can be adjusted by the coach or coxswain to alter the ratio at different parts of the stroke to force the rower to increase or decrease the speed of the hands or seat movement and to synchronize with the stroke of the boat. The device for capturing individual athlete/rower data becomes more critical when placed in a four person boat as most four person racing shells have the coxswain sit in the bow of the boat where they face the front of the boat and the rowers are sitting behind the coxswain. In boats that do not have a coxswain, mostly sculling boats, the stroke or lead rower can position the personal computing device in a cradle to view the data on the screen or the device can capture the data for later analysis to be viewed by all rowers in a coxswain-less boat.

DESCRIPTION OF THE DRAWINGS

FIG. 2A is an elevation view of a magnetic wheel assembly for underseat installation.

FIG. 2B is a cross-section of the magnetic wheel assembly of FIG. 2A.

FIG. 2C is a perspective view of the magnetic wheel assembly of FIG. 2A.

DETAILED DESCRIPTION OF THE INVENTION

Figure 1A:
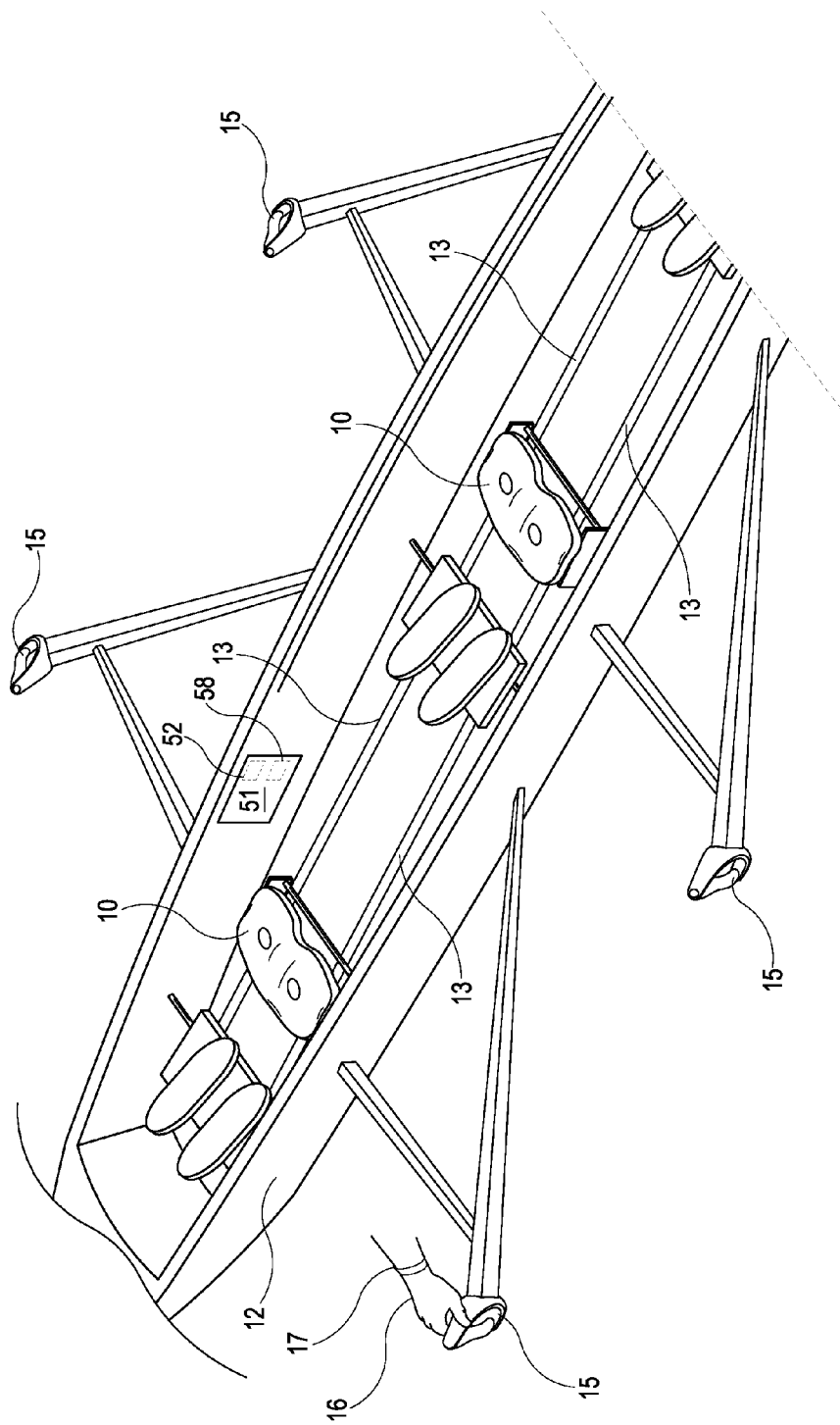
FIG. 1A is a depiction of the mid-portion of a racing shell employing mechanical sensors.
Figure 1B:
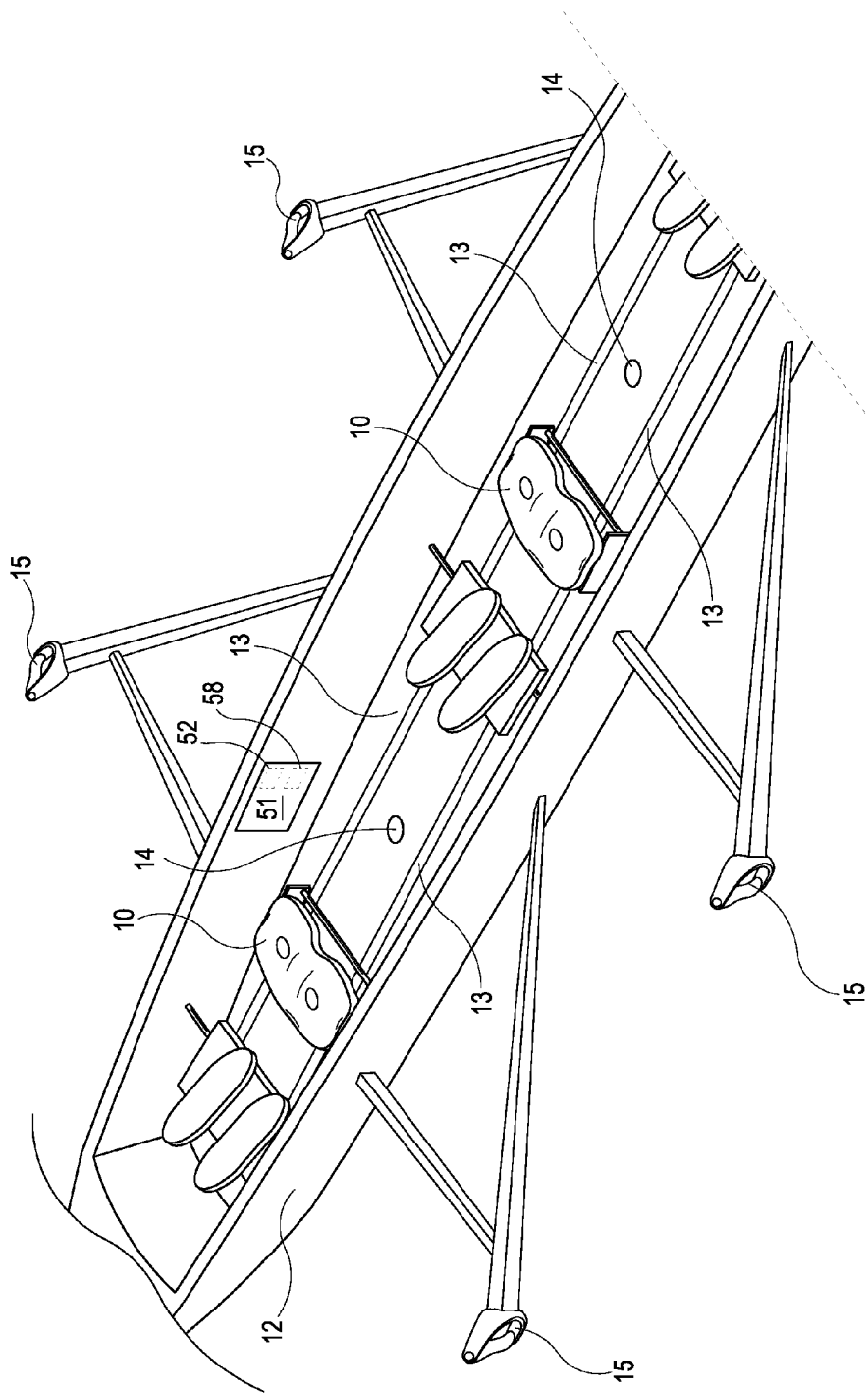
FIG. 1B is a depiction of the mid-portion of a racing shell employing electronic sensors.

The invention will be described with reference to the figures. FIG. 1A shows a shell equipped with a mechanical sensor assembly and FIG. 1B shows a shell equipped with an electronic sensor assembly. In both FIGS. 1A and 1B, seats 10 are positioned in a racing shell 12 and sit on two rails 13. Seats 10 travel back and forth on the rails as the rower rows.

A. Electronic Sensor

Figure 3A:
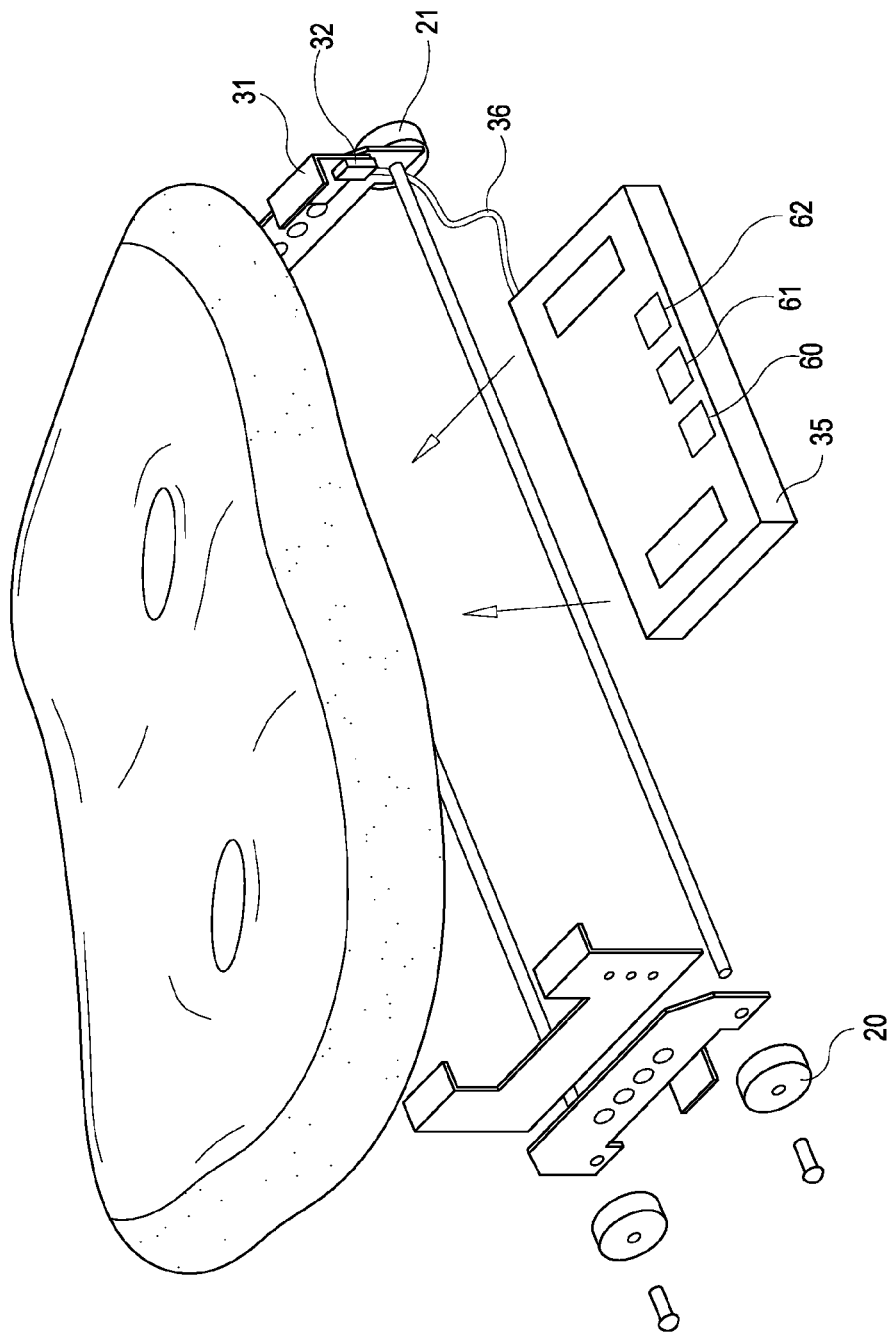
FIG. 3A is a view of the underseat mechanical sensor assembly.
Figure 3B:
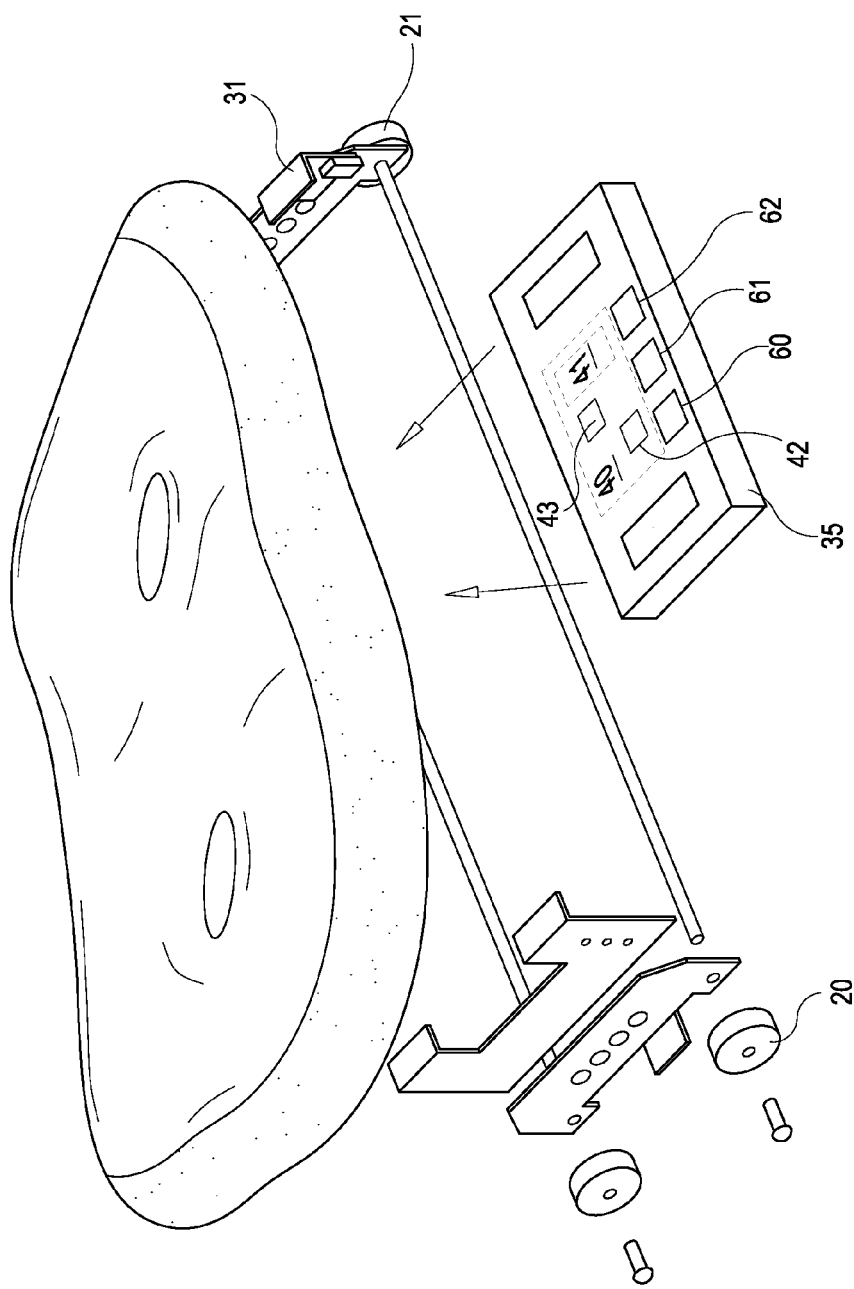
FIG. 3B is a view of the underseat electronic sensor assembly.
Figure 4:
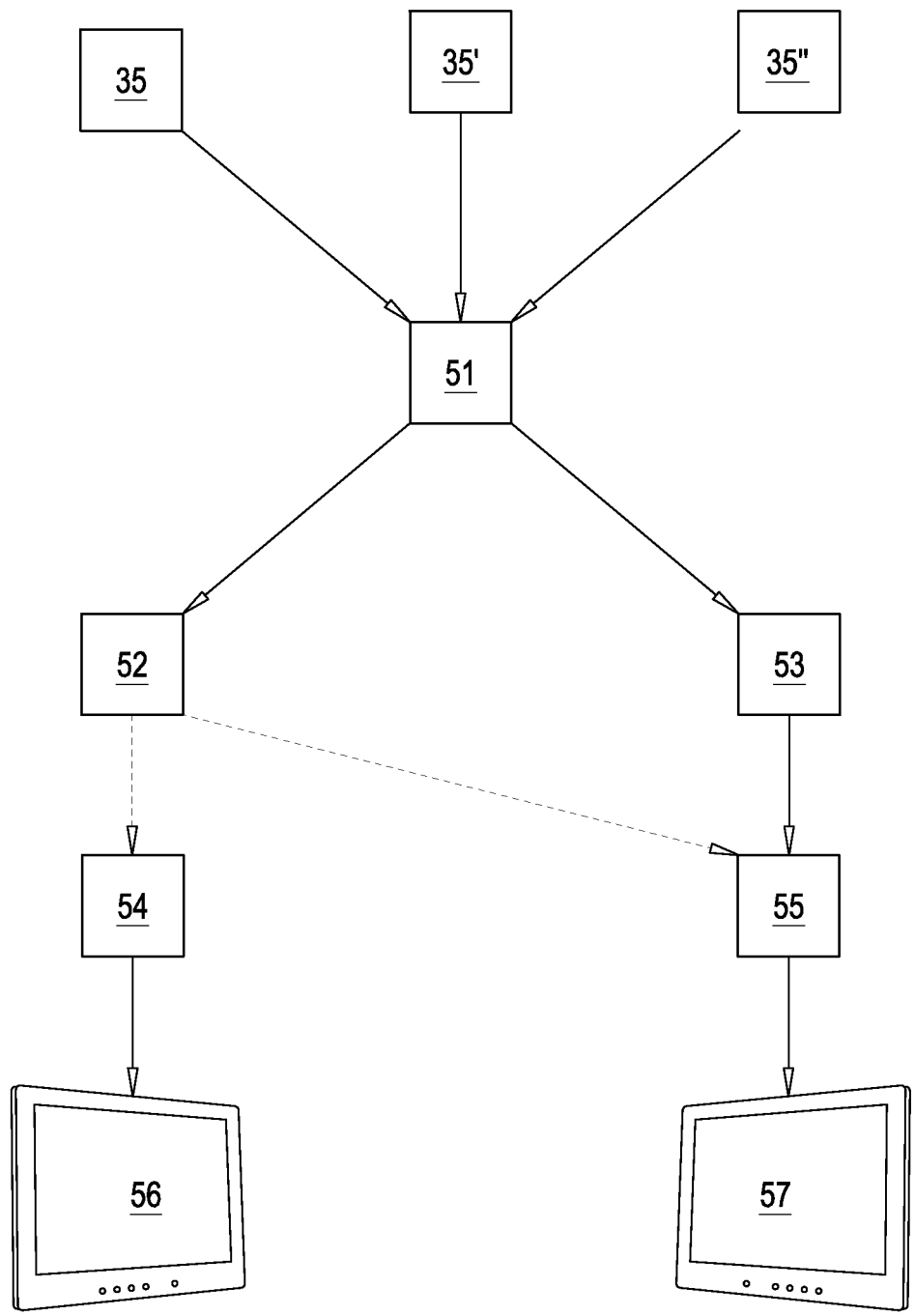
FIG. 4 is a schematic diagram of the information systems shown in FIGS. 1A, 1B, 3A, and 3B.

As shown in FIG. 3B, the electronic system is composed of unit 35 attached under seat 10. Sensor unit 35 houses the electronics, specifically, a micro electromechanical system 40 (MEMS) with its attendant software, radio transmitter 42, CPU 43, electronic processors 60, transceivers 61, and boards 62. A magnet 14 is affixed between the two tracks 13 on the deck of the boat for each rower, as shown in FIG. 1B. When unit 35 passes over magnet 14 it creates a consistent time stamped point to collect data from the rower. For example, as the rower is driving, seat 10 passes over magnet 14 and data is collected; seat 10 changes direction and travels in the opposite direction passing magnet 14 again, thereby creating a fixed time stamped point. The system determines the time between the two events and the acceleration of the seat as it travels in either direction to determine the total distance and speed traveled.

In a preferred embodiment, MEMS 40 measures the static acceleration of gravity as well as the dynamic acceleration resulting from motion or shock is installed. An example of a suitable device is Analog Devices ADXL345. MEMS 40 monitors the axis running lengthwise of the boat from bow to stern. The system measures positive acceleration as motion toward the stern and negative acceleration as motion going toward the bow. The system software receives the acceleration data at a 100 Hz rate, integrates the sum over a fixed time interval to determine the velocity, then integrates the velocity to determine the distance traveled. The system determines a drive or return stroke as the time measured between the instants when the acceleration changes direction. For example, as the rower is driving, the acceleration will be positive. When the rower reaches the catch and starts the return the acceleration will flip sign and become negative. The system finds the time between the two events and determines the total distance traveled by integration.

The MEMS accelerometer 41 is a chip mounted on a board. It does not suffer from mechanical wear. The accelerometer can be turned off to draw minimal current while the boat is not moving. The information will be used to turn off the radio transmitter 42 and CPU 43 to further reduce current draw allowing the device to sit idle drawing minimal current. The accelerometer can be re-calibrated in circuit by issuing a command to the device via remote control.

Accelerometers can be used to measure more than just the seat movement. In a further embodiment, they can be attached to the power hand, wrist 16, or forearm of each rower. Alternating seats would have the accelerometer 17 on alternating wrist 16. This allows for measurements of both the up-down motion and the back-forward motion of the wrist or oar handle 15 and provides comparative information on the positioning of all the rowers on each side of the boat, giving the coach or coxswain information on whose hand heights vary the most from the other rowers and whose hand speed is different from the stroke's hand speed.

B. Mechanical Sensor

In a further embodiment, shown in FIGS. 1A and 3A, attached to seat mount 31 on each seat 10 are three wheels 20 and a fourth wheel 21. Wheels 20 and 21 allow seat 10 to move along rails 13 in a rowing boat. Wheel 21 has four magnets 22 embedded exactly 90 degrees apart rotationally around the wheel, as shown in FIGS. 2A, 2B, and 2C. Sensor 32 is mounted on seat mount assemblies 31. Sensor 32 captures each time a magnet 22 passes it. Wheel 21 rotates forward when the rower rolls seat 10 forward toward the stern and rotates backwards when the rower rolls the seat backwards towards the bow of the boat. Once magnet 22 rotates past sensor 32, sensor 32 captures and time stamps this data point. A series of data is captured by sensors 32 created by the passage of the four magnets 22 on wheel 21 before the two sensors 32.

This data is sent from wheel 21 via wire 36 to main unit 35 under the seat, shown in FIG. 3. Sensor unit 35 holds electronic processors 60, transceivers 61, and boards 62 which can receive, process, and transmit data.

C. Data Treatment

The captured data from either the electronic or magnetic sensors is processed to provide stroke rating, ratio, slide length, deceleration of slide, speed of slide at the drive, and speed of slide on the recovery. In a larger boat, HUB 51 will be installed in the mid section of the boat. HUB 51 has a master transceiver 52 as well as a microprocessor 58 and other electronic components within. Hub 51 will communicate with each sensor unit 35 to gather and organize the data and will then forward this organized data though both a transceiver 52 as well as a hard data line 53. The transceiver data can be sent wirelessly to the coach who is expected to be within a reasonable distance from the sweep or sculling boat. It can also be sent wirelessly to the coxswain. The data sent by hard wire will go to the coxswain. Both the coxswain and the coach will have a personal computing device 54, 55 that will accept the organized data and quickly bring the data to a screen 56, 57 where the coach and coxswain can view the almost real-time data, compare the data of each rower and provide immediate feedback as to corrective actions of each individual rower. Personal computing device will capture the data in a log file which can then be reviewed at a later date for extensive analysis in a slow motion, stroke by stroke analysis comparing each individual rower to the other rowers in the boat.

One critical item that the system captures is the deceleration of each rower's seat. Since the purpose of rowing is to have all athletes synchronized throughout the entire stroke, any deviation from being "in time" or synchronized with the stroke by any rower will have an impact on the boat. This device measures each rower's seat movement and will calculate the speed in which each rower approaches the "catch". The catch is the point at which the slide stops and the rower places the oar blade into the water, drives the legs and propels the boat.

The sensors capture the speed of each rower's seat and calculate the deceleration of each seat. This data is provided to the coxswain/coach in almost real time where the coxswain can easily see which rower is not synchronized with the other rowers in the boat or the stroke. The deceleration will provide information for two critical areas: the speed of the slide as it relates to other rower's slide speed and the measure of the average speed of the deceleration of the slide. The higher the deceleration speed, the more of a negative impact the rower's momentum will have on the "glide" of the boat.

Each of the data components captured by the device for capturing individual athlete/rower data has a specific importance to understanding what the athlete is doing in the boat. Since rowing throughout the world has developed differently with different styles, the device for capturing individual athlete/rower data can provide the data to the coach and coxswain and allows them to determine what individual athlete is doing in the boat and to coach the rower to the style of technique they would like to see taught to their athletes.

Data may be presented on a number of different screens as the volume of data is too large for a single screen presentation or for the coach or coxswain to be able to absorb the information to benefit the athlete for immediate feedback. The screen can be changed to allow the rower, coxswain or coach to view a specific technical item being captured. The device can be analyzed at a later date and can be used comparatively from rower to rower. The playback of the captured data can be displayed frame by frame to allow the reviewer to specifically see where each rower's seat was during any specific point in the stroke, the speed of the slide, average deceleration of the slide, ratio of each rower, and stroke rating of each rower.

What is claimed is:

1. A device for measuring and displaying a plurality of parameters of a seat slide in a boat on drive and recovery comprising:
    a seat on which a rower sits slidably mounted on a first rail and a second rail wherein the rails are affixed in a parallel configuration on a bottom portion of the boat and wherein the seat is configured to slide a length in a first direction on drive and in a second direction on recovery;
    a housing attached to the seat;
    a sensor assembly, located within the housing, which comprises a first central processing unit which detects, measures, and processes a first set of parameters of the seat slide wherein the parameters include length of the slide on drive and recovery; speed of the slide on drive and recovery, deceleration of the slide, effect the deceleration has on boat performance, stroke rate, and ratio of the parameters on drive to the parameters on recovery;
    a hub which receives the first set of parameters transmitted by the sensor assembly and which includes a second central processing unit which organizes and transmits the first set of parameters to a personal computing device capable of receiving the first set of parameters and having a display which displays the first set of parameters.

2. The device as claimed in claim 1 further comprising a number of seats, a number of housings, and a number of sensor assemblies, wherein each seat is equipped with one of the number of housings and one of the number of sensor assemblies, wherein each of the number of sensor assemblies transmits a set of parameters, and wherein the hub receives the number of sets of parameters transmitted by the sensor assemblies and organizes and transmits the number of sets of parameters to the personal computing device.

3. The device as claimed in claim 2 wherein the number of sets of parameters are captured to a file on the personal computing device.

4. The device as claimed in claim 2 wherein the personal computing device emits sounds audible to the rower that correspond to the sets of parameters received.

5. The device as claimed in claim 1 wherein the sensor assembly further comprises an accelerometer.

6. The device as claimed in claim 1 wherein the rower wears a second accelerometer on a body part, which second accelerometer transmits data pertaining to the location and movement of the body part to the hub.

7. The device as claimed in claim 6 wherein the body part is an arm.

* * * * *